United States Patent [19]

Maus

[11] 4,130,020
[45] Dec. 19, 1978

[54] PORTABLE BEARING SUPPORT

[75] Inventor: Otfrid Maus, Darmstadt, Germany

[73] Assignee: Schenck-Auto-Service Geraete GmbH, Darmstadt, Germany

[21] Appl. No.: 832,832

[22] Filed: Sep. 13, 1977

[30] Foreign Application Priority Data

Sep. 17, 1976 [DE] Fed. Rep. of Germany ....... 2641890

[51] Int. Cl.² .............................................. G01M 1/28
[52] U.S. Cl. ..................................................... 73/457
[58] Field of Search .................................. 73/457, 458

[56] References Cited

U.S. PATENT DOCUMENTS 3,903,746  9/1975  Goebel ................................... 73/457

FOREIGN PATENT DOCUMENTS 2148107  5/1973  Fed. Rep. of Germany ............. 73/457
951269  3/1964  United Kingdom ....................... 73/457

Primary Examiner—James J. Gill
Attorney, Agent, or Firm—Connolly and Hutz

[57] ABSTRACT

A device for measuring out-of-balance forces comprising a frame mounted on wheels, a load receiver mounted on the frame, an elongated pointer arm having one end securely fastened to the frame and a relative type pick-up mounted on the frame in communication with the free second end of the pointer. When a load is applied to the load receiver, the pick-up senses the deflection of the pointer and converts that mechanical movement into an electrical signal for measurement.

8 Claims, 4 Drawing Figures

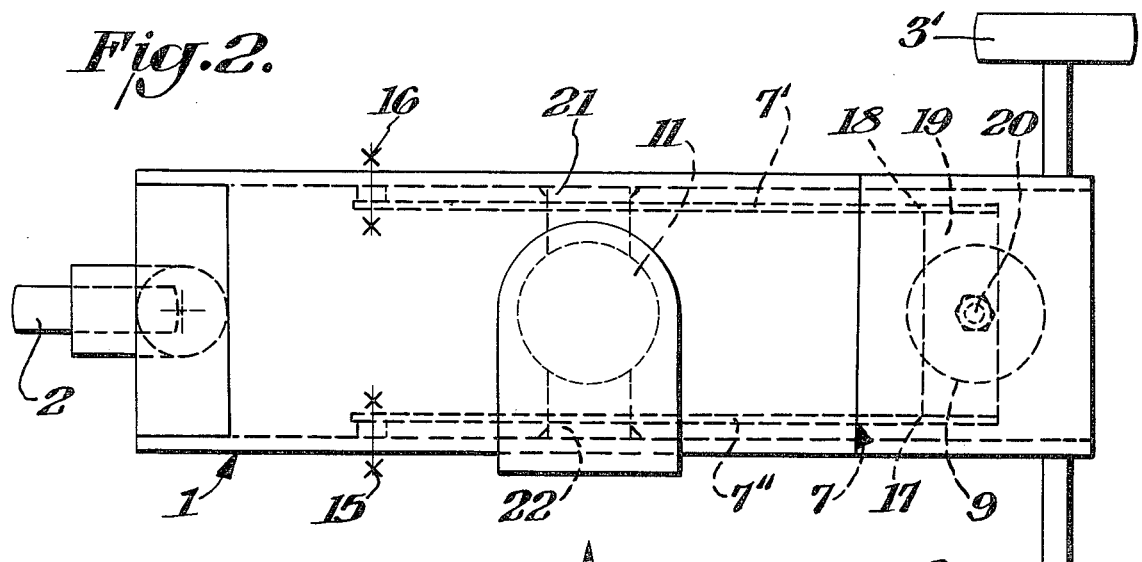
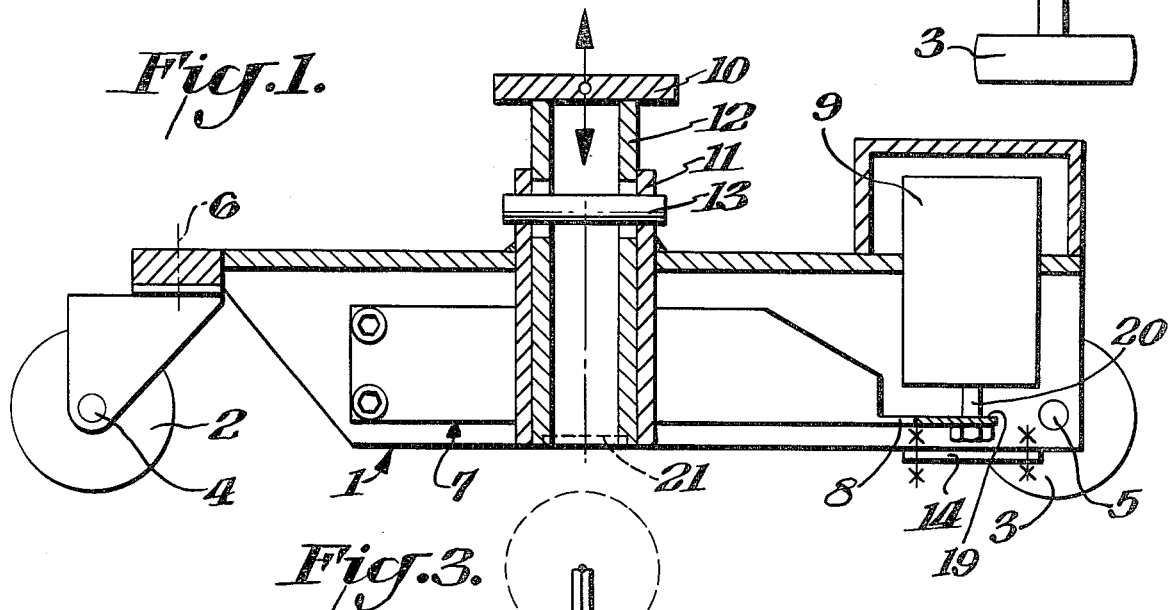
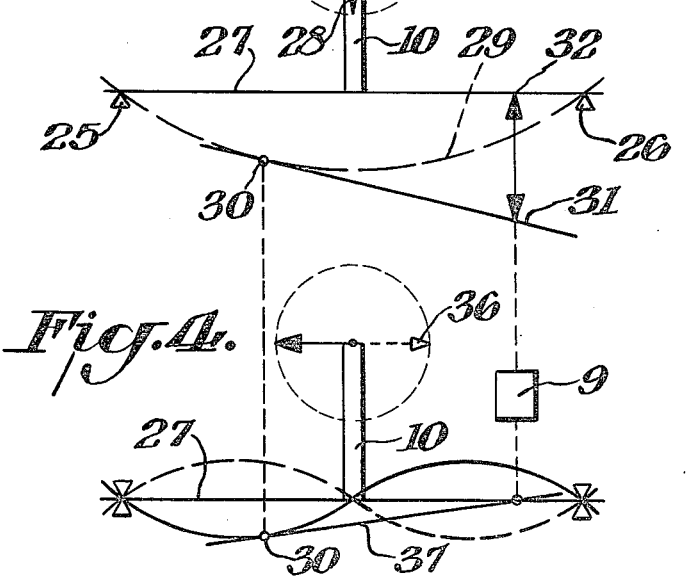

PORTABLE BEARING SUPPORT

DISCLOSURE OF THE INVENTION

The invention relates to a portable bearing support having a load receiver, test value converter comprising a mechanical to electrical signal transducer (a relative type pick-up) for measuring out-of-balance forces, and a frame connecting the wheels thereof.

For the measuring of out-of-balance forces of motor vehicle wheels, used on the motor vehicle are portable bearing supports which have a load receiver, a relative type pick-up for converting mechanical forces to electrical signals, and a frame connecting the wheels of the portable bearing support. In order to keep side effects in the measuring procedure to a minimum, such bearing supports are usually provided with gradually adjustable load receivers. Since an assurance should furthermore be provided of avoiding the disturbance variables, e.g. transverse forces, superposing the measuring values, a parallel construction for the load receiver is strived for in the known portable bearing supports. This parallel construction for the elimination of disturbing interference forces, achieved by means of flat springs, makes it mandatory to construct the portable bearing support to be very tall even without the load receiving element. As a result of this over-all height, the structural part to be analyzed (e.g., an automobile wheel mounted on the motor vehicle) maintains a greatly sloping position which necessarily leads to an influence of the measurement.

Emanating from this state of the art, the object of the current invention is to provide a device for measurement of out-of-balance forces, avoiding the above-mentioned drawbacks, wherein the separation is made possible between the measuring value and the detrimental portion of the measuring, particularly the horizontal component. This object is solved according to the invention in that the load receiver is mounted on the frame whose flexure deflects an indicator arranged on the frame and in that its deflection is picked up by a relative type pick-up (transducer) connected to a free pointer end. The relative type pick-up (transducer) senses the movement between two given points. Such relative type pick-ups are known to those in the art and are effective to convert mechanical or light energy into electrical signals. By measuring the flexure of the frame, the special advantage of building the novel portable bearing support very low is achieved and, in addition, may be designed in light construction and that there need not be provided an additional rigid frame on which the relative type pick-up is supported.

A development of the invention comprises mounting the pointer on the frame at the point at which an alternating bending force, setting in at right angles to the desired measuring direction, has an effect more than zero yet less than the maximum, that the free pointer end is not additionally affected by the alternating bending force, however, and that the relative type pick-up, arranged on the frame at this point, is connected with the free pointer end. If the pointer were arranged at any point, not considering the position of the relative type pick-up, the free pointer end would be affected not only by the out-of-balance force acting in the measuring direction but also by the components of the out-of-balance force acting in all other directions, particularly by the horizontally functioning out-of-balance component. While measuring the imbalance, an additional alternating bending moment is then transmitted to the frame due to the horizontal forces by means of the load receiver, said moment having a zero point at the base of the load receiver and at the frame points at which the wheels represent a bearing for the frame. If then a tangent is joined to the bending line, excluding the given zero points and the maxima and minima, this tangent will intersect the zero line at one point; if the tangent is in the form of a pointer, at this point the alternating bending forces, setting in at right angles to the desired measuring direction, will not affect the deflection of the pointer and thus will transmit to the relative type pick-up, which is connected at this point with the free pointer end, only the forces which function in the desired measuring direction. A separation of the information signal from the oscillating mixture takes place thereby in a simple manner.

In a still further development, it is proposed that in the unloaded state, the relative type pick-up and the pointer form a horizontal line. By this design a particularly compact type of construction is achieved and thus the further drawback of a large over-all height is obviated for the elimination of false signals.

In yet another development of the subject matter of the invention, it is proposed that the pointer be attached to a vertical part of the frame. As a further development of the subject matter of the invention, it is viewed that the load receiver be arranged between the mounting points of the pointer and the relative type pick-up. A particularly advantageous development of the novel subject matter makes it possible for the novel portable bearing support to have a very short type of construction and, in connection with a still further characteristic of the invention which is characterized in that the frame is constructed in U shape, represents a solution to the problem in a comprehensive manner.

In order to protect the novel portable bearing support from further interfering influences, it is proposed according to the invention that for the avoidance of overloads the relative type pick-up emit additionally a warning signal upon exceeding a specified deflection of the pointer. In a further development, this device may simultaneously be utilized for the weighing of the part to be analyzed. Such a development of the subject matter of the invention is distinguished in that a further relative type pick-up emits, on the basis of the pointer deflection, a signal representing the weight of the part to be analyzed.

By way of the exemplary embodiments displayed in the drawings, the subject matter of the invention is explained in greater detail.

FIG. 1 illustrates a novel bearing support in cross-section.

FIG. 2 illustrates the top view of the novel bearing support of FIG. 1.

FIG. 3 illustrates in schematic display the effect upon the novel bearing support by a vertical force affecting the load receiver.

FIG. 4 illustrates in schematic display the effect upon the novel bearing support by a horizontal force affecting the load receiver.

The exemplary embodiment of a portable bearing support shown in FIG. 1 comprises a frame 1 on which wheels 2, 3 and 3' are mounted on axes 4 and 5. In the example, wheel 2 may be turned, for easier handling of the portable bearing support, about a vertical axis 6.

Arranged on frame 1 by means of screw mounts is pointer 7, which is connected by its free end 8 with a relative type pick-up 9, also arranged on frame 1. In addition, frame 1 supports load receiver 10, which in a simple manner consists of two telescoping tubes 11 and 12 and which, upon a completed telescoping, are connected by means of a rod 13.

Tube 11 is welded to the frame, while tube 12 is arranged vertically slidable as compared to the frame. In addition, in the area of the relative type pick-up 9 and of free indicator end 8, there is arranged on frame 1 a stop plate 14, which functions in the simplest manner as an arresting means if an excessive static load is placed on the load receiver 10 and the flexure of frame 1 would undertake too great a factor.

The top view according to FIG. 2 shows that the pointer is firmly connected with frame 1 only at the mounting points 15, 16. The mounting is not limited to the schematically displayed screw mounting. As further shown in the top view, pointer 7 consists of two arms 7' and 7", which at their particular free end 17, 18 are connected by means of plate 19, in the central area of which a cooperation with the relative type pick-up 9 takes place by means of a connection 20. In FIG. 2 it is also illustrated how tube 11 is connected to frame 1 by means of stiff connectors 21, 22.

From the combined view of FIG. 1 and FIG. 2, it is shown that by means of the novel arrangement of a pointer on a frame with a loading of a load receiving element 10, equally arranged on the frame, the flexure of the frame may be measured.

In FIG. 3 it is schematically illustrated how, as a result of the structural arrangement of the pointer on the frame, a separation of the disturbance variables from the effective area may be carried out. Support 25 corresponds to wheel 2 and support 26 corresponds to wheels 3 and 3'. Line 27 between the supports represents frame 1 in a simplified form and in particular in the undeflected state. By the deflection of the frame by a vertical force 28, the vertical component of the out-of-balance force, the frame is deflected into form 29, shown by dashes. If then a tangent 31 is deflected at a point 30 (tangent 31 is equated to pointer 7) the deflection of the frame can be measured at a measuring point 32.

If points 30 and 32 are then selected at random, it is easily recognized in FIG. 4 that with the occurrence of a horizontal component 36 of out-of-balance force 28, a supplemental deflection will take place at the measuring point 32.

The measured magnitude does not correspond to the vertical imbalance magnitude alone, therefore, but rather it is simultaneously falsified by its horizontal component.

However, if point 30, i.e. mounting 15, 16 according to FIG. 2 of pointer 7, is placed at a point of line 27, deformed by the alternating bending of the horizontal forces, whose tangent 37 intersects the non-deflected line 27 and connects at this point the relative type pick-up 9 with the free pointer end 8 of pointer 7, then only the imbalance forces effective in vertical direction are received from the relative type pick-up.

As shown by FIGS. 3 and 4, it is not necessary that the load receiver be arranged in the center between the two supports 25 and 26; it may also be arranged outside the two supports 25 and 26. Even with such an arrangement, a separation between effective signal and error signal is achieved with the observance of the rules disclosed in FIGS. 3 and 4.

In addition, the novel portable bearing support may also be utilized for the evaluation of the parts mounted thereon. If the part, e.g. a wheel mounted on a motor vehicle, is accommodated by receiver 10 on steering knuckle bearing, then frame 1 bends according to line 29 to FIG. 3, even then when the wheel is not in rotation, in order to measure the imbalance forces setting in. There results, therefore, a static deflection, which may be indicated by means of free pointer end 8, be it in the relative type pick-up 9 or by means of a further relative type pick-up. Furthermore, plate 19 may be designed as a limit switch, at the contact of which the current supply to relative type pick-up 9 is interrupted by the free pointer end 8, so that no incorrect measurement is caused by overloading the portable bearing support.

I claim:

1. A portable bearing support for measuring out of balance forces comprising:
   (a) a flexible elongated frame having wheel means mounted at each end;
   (b) a load receiver mounted on said frame between the ends thereof;
   (c) an elongated non-loadbearing pointer arm having one end securely fastened to said frame and having the other end free to move but in communication with a relative type pick-up which is securely mounted on said frame;
   whereby the flexure of the frame caused by a load applied to the load receiver causes deflection of the free end of the pointer which deflection is detected and measured by the relative type pick-up.

2. A portable bearing support of claim 1 further comprising mounting said pointer on said frame at a point at which alternating bending forces of the load act at a right angle to the desired measuring direction and have a value greater than zero but less than the maximum and whereby the second pointer end is not affected by the alternating bending forces and said relative type pick-up is connected to the second pointer end.

3. A portable bearing support of claim 1 further comprising the pointer and the relative type pick-up being mounted on the frame in a horizontal line in the unloaded state.

4. A portable bearing support of claim 1 further comprising the pointer being mounted on a vertical section of the frame.

5. A portable bearing support of claim 1 further comprising mounting the load receiver on the frame between the frame mounting points of the pointer and the relative type pick-up.

6. A portable bearing support of claim 1 further comprising the frame having a U-shape.

7. A portable bearing support of claim 1 further comprising means for producing a warning signal whenever the relative type pick-up senses a pointer deflection exceeding a predetermined level.

8. A portable bearing support of claim 1 further comprising a further relative type pick-up responsive to pointer deflection which emits a signal representing the weight of the part to be analyzed.

* * * * *